Jan. 14, 1941.   G. W. ALLAN   2,228,982
TYPOGRAPHICAL MACHINE
Filed Dec. 30, 1939   5 Sheets-Sheet 2
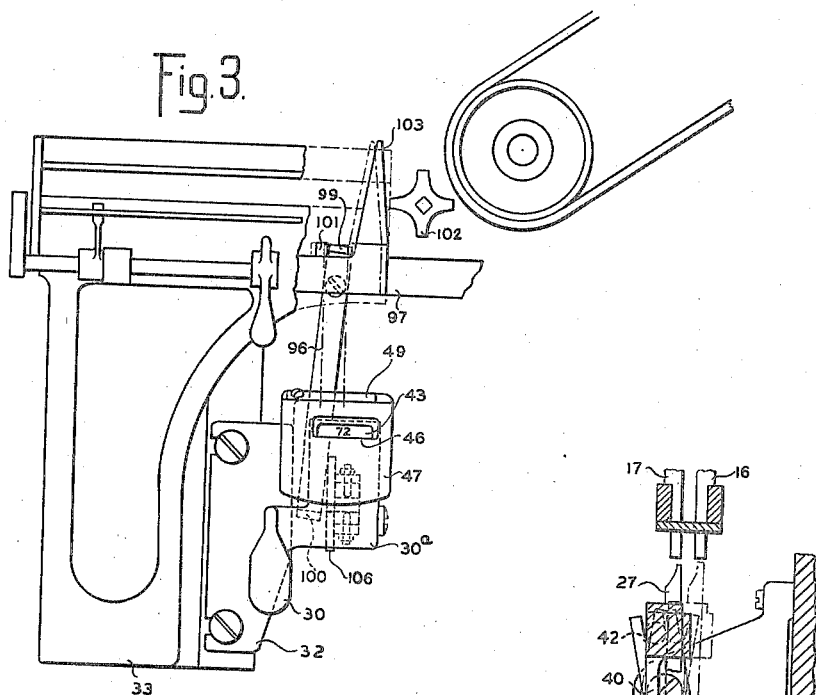
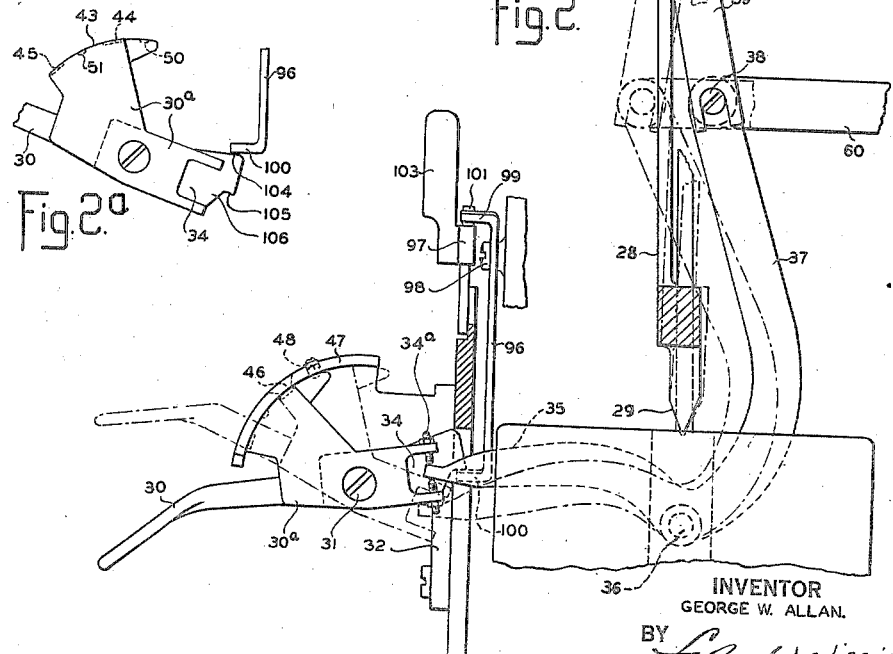
INVENTOR
GEORGE W. ALLAN.
BY LeRoy W. Willis
ATTORNEY Jan. 14, 1941.   G. W. ALLAN   2,228,982
TYPOGRAPHICAL MACHINE
Filed Dec. 30, 1939   5 Sheets-Sheet 3
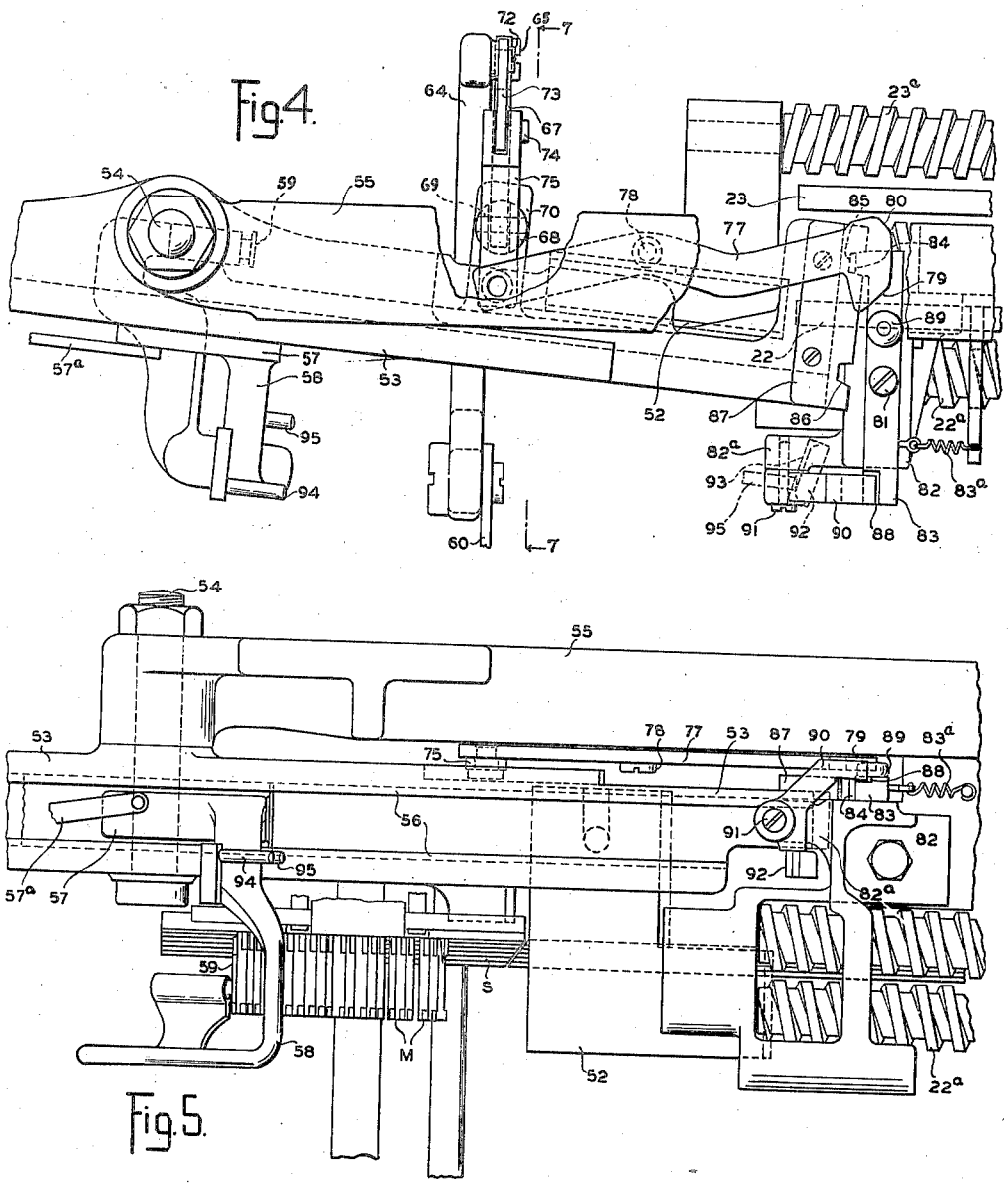
INVENTOR
GEORGE W. ALLAN.
BY LeRoy W. Willis
ATTORNEY Jan. 14, 1941.   G. W. ALLAN   2,228,982
TYPOGRAPHICAL MACHINE
Filed Dec. 30, 1939   5 Sheets-Sheet 4

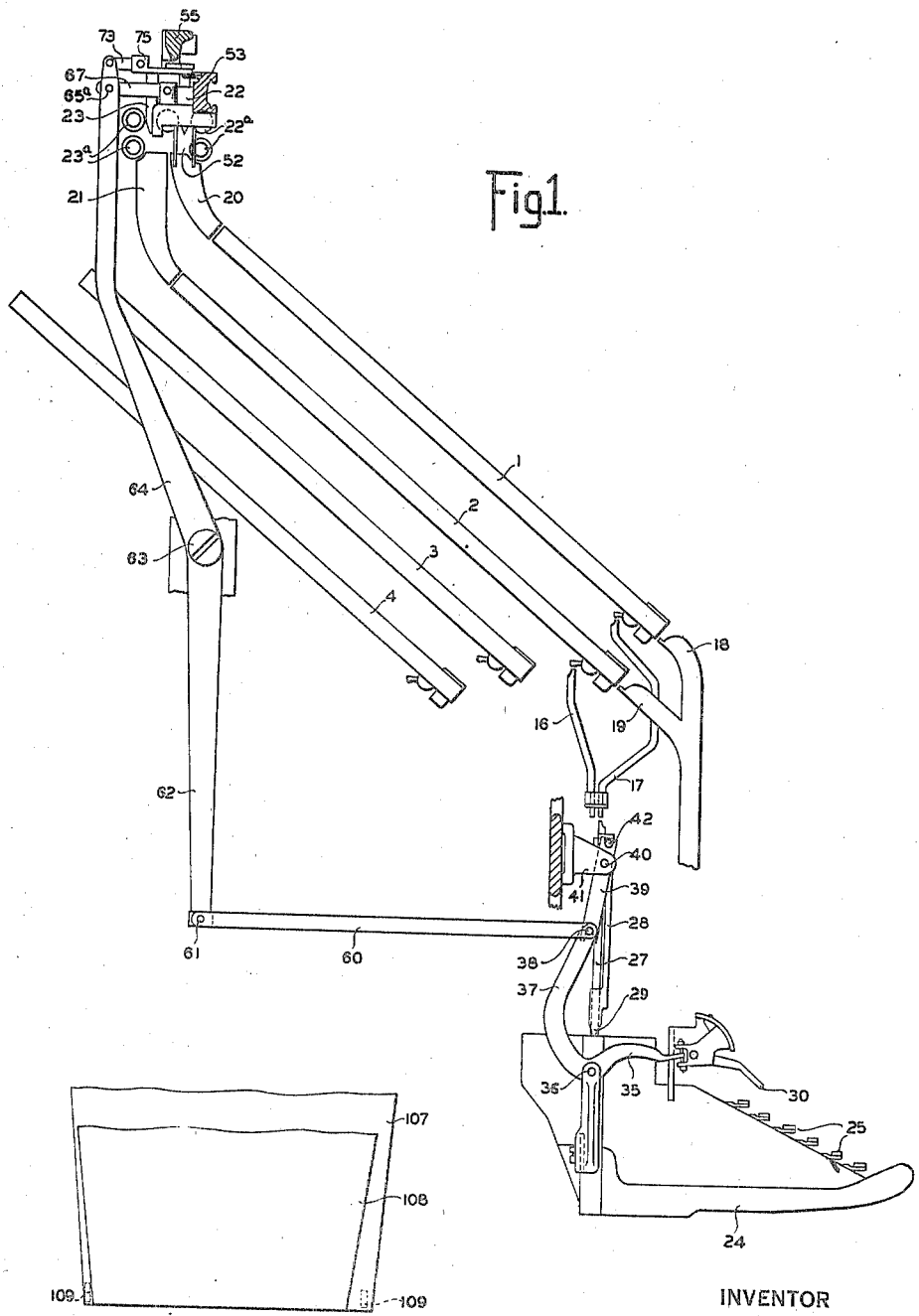

INVENTOR
GEORGE W. ALLAN.
BY
ATTORNEY

Jan. 14, 1941.  G. W. ALLAN  2,228,982

TYPOGRAPHICAL MACHINE

Filed Dec. 30, 1939  5 Sheets-Sheet 5

INVENTOR
GEORGE W. ALLAN.
BY
*LeRoy W. Willis*
ATTORNEY

Patented Jan. 14, 1941

2,228,982

UNITED STATES PATENT OFFICE 2,228,982

TYPOGRAPHICAL MACHINE

George W. Allan, Brooklyn, N. Y., assignor to Intertype Corporation, Brooklyn, N. Y., a corporation of New York Application December 30, 1939, Serial No. 311,919

16 Claims. (Cl. 199—16)

The present invention relates to improvements in typographical machines of the general class disclosed in U. S. Letters Patent No. 436,532 granted September 16, 1890, wherein circulating character bearing matrices stored according to character in channeled magazines are composed into lines from which type bars or slugs are cast, the matrices being transferred subsequent to the casting operation to distributing mechanism adapted to return them to their proper places of storage in the magazines from which they were drawn.

More particularly, the invention relates to machines of this class equipped with a plurality of superposed magazines arranged in a shiftable column and wherein, according to modern practice, both 72-character and 90-character matrix fonts may be employed. Such machines are provided with two sets of matrix assembling and distributing devices which differ in form in order to cooperate respectively with magazines containing the 72 and 90-character fonts and the magazines are usually arranged in orderly manner so that different desired pairs thereof in the shiftable column may be brought simultaneously into operative relation with the respective sets of assembling and distributing devices. A single keyboard is provided having a set of manually adjustable keyboard operated rods which may be connected selectively to either magazine of the active pair.

Machines having double assembling and distributing facilities are well known and are widely used for the purpose of "mixing" matrices from two fonts, whether alike or different as to the number of characters in each, the mixing feature involving devices associated with the two distributors for automatically sorting the matrices according to font to thereby direct them to the proper one of the distributors. However, there are many classes of composition which do not require the "mixing" feature and which may be facilitated simply by the availability on the machine of several desired 72 and 90-character fonts, any one of which may be selected for use, and regardless of the particular number of each or their relative order within the shiftable column of magazines. However, if the magazines are not arranged in orderly pairs, it will be evident, for example, that should an adjacent pair of magazines both contain a 72-character font, one of them would fall in operative relation with the 90-character assembling and distributing devices, a condition which may confuse the operator unless such unrelated magazine were rendered inoperative.

Moreover, in the absence of the automatic matrix selecting feature common to double distributor machines used for mixing purposes, it will be evident that other means must be provided for assuring the return of the matrices drawn from a selected font to the proper one of the two distributors. These conditions apply more particularly of course when the sets of matrix assembling and distributing devices respectively for 72 and 90 character fonts are fixed, that is, when each set constantly occupies a fixed operative position ready for the passage therethrough of matrices released from fonts presented thereto and corresponding therewith in form, and the present invention is directed more especially to an arrangement of this kind.

The object of the present invention is to provide means whereby connection of the keyboard manually to either a 72 or 90-character font will effect simultaneously a corresponding adjustment for assuring direction of the matrices to the 72 or the 90-character distributor as the case may be. To this end the invention provides in the embodiment herein shown a train of connections extending from the usual adjusting devices for the keyboard operated rods to a single distributor box which is common to both distributors, the connections provided being operative to adjust the distributor box simultaneously with changes in adjustment of the keyboard rods.

A further feature of the invention is the provision of means for preventing actuation of the matrix escapements of a magazine improperly related to the assembling devices with which it is moved into register. Thus, should a 72-character font be shifted into register with the 90-character assembling devices the invention provides a pair of rollers adapted to elevate the forward end of the magazine containing such font out of range of the set of ninety escapement actuating rods as the magazine is moved into operative position.

Further, to prevent assembling in the same line matrices from a 72 and 90-character font, both of which at times may register with the proper assembling devices, the invention provides a lock which prevents alteration of a chosen adjustment of the keyboard rods as soon as the first matrix from a selected font enters the usual assembling elevator.

Finally, the invention provides a locking device to prevent altering a given adjustment of the keyboard rods and distributor box until all of the matrices in a preceding line (matrices assembled from a selected font) have been delivered to the distributor for which the adjustment was made.

In the accompanying drawings, the improvements according to the present invention are shown merely by way of example and as applied to a machine of well known construction, and obviously many changes and variations may be made in the form, arrangement and combination of parts as well as their mode of operation in order to suit machines of somewhat different construction. It is to be understood, therefore, that the invention is not limited to any specific form or embodiment except insofar as such limitations are specified in the claims.

Referring to the drawings:

Fig. 1 is a side elevation, partly diagrammatic, showing the manually adjustable connections of the invention as applied to a machine of the type referred to.

Fig. 2 is an enlarged view of the keyboard connections shown in Fig. 1 in two different positions and shows also the relation thereto of the safety lock associated with the assembling elevator.

Fig. 2a is a detail of a portion of the adjusting lever in Figs. 2 and 3.

Fig. 3 is a front elevation of the usual assembling elevator showing the safety lock in Fig. 2 from the front.

Fig. 4 is a partial plan view of the devices of the distributing mechanism which are adjustable by means of the connections provided by the invention, the parts being shown in position for directing matrices to the front one of the pair of distributors.

Fig. 5 is a front elevation of the parts shown in Fig. 4.

Fig. 10 shows diagrammatically the difference in width between two types of magazines.

Similar parts are designated by the same reference characters in the different figures.

Figure 6:
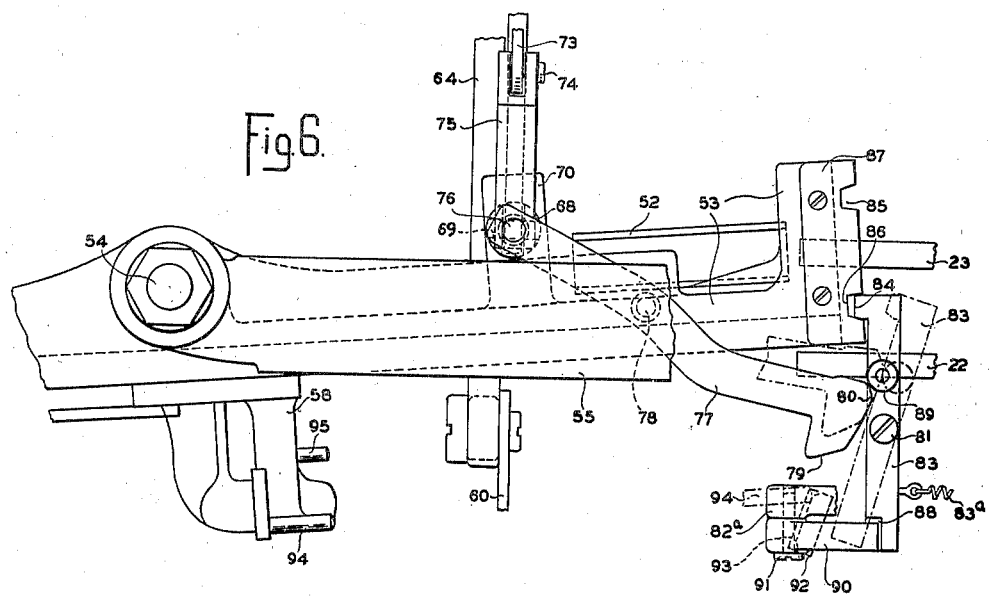
Fig. 6 is similar to Fig. 4 and shows the adjustable devices in position for directing matrices to the rear one of the pair of distributors.
Figure 7:
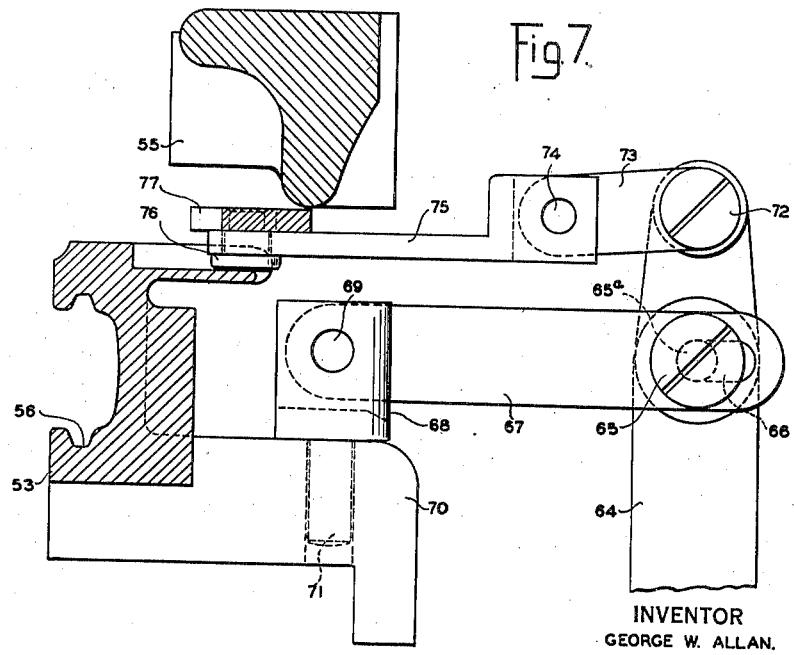
Fig. 7 is an enlarged view, in section, taken on the line 7—7 in Fig. 4.

The invention herein is shown as applied to a conventional form of typographical machine having four superposed magazines arranged in a column which is shiftable fore and aft as a unit by shifting mechanism such as disclosed in Letters Patent Nos. 1,650,552 granted November 22, 1927 and 1,988,417 granted January 15, 1935. The magazines, designated 1, 2, 3 and 4 normally rest flatwise on underlying frames 5, 6, 7 and 8, the latter being suitably secured together by side tie plates of which the plate 9 is representative. As in the above mentioned patents the magazine unit rests freely at its lower end on rollers 10 provided on a cranked or offset portion of a rotatable cross shaft 11, the latter having fixed thereto toward each end a pinion which engages a toothed rack 12, one such rack being provided in each of the side members 13 of the machine frame. At its opposite ends shaft 11 is journaled eccentrically in bushings 14 carried in a bearing in the lower end of a pair of curved links 15, the upper ends of these links being journaled on an upper cross shaft, not shown, in the frame 8 and supported by rollers thereon adapted to travel on upper tracks running parallel to the toothed racks 12.

Upon rotation of shaft 11, as by the crank handle shown in the patents referred to, the pinions thereon traveling on the racks 12 exert either a forward or rearward pull on the links 15 and thus on the upper cross shaft carried by the lowermost magazine frame of the unit. Meanwhile, as shaft 11 rotates, the offset portion thereof imparts a lifting and lowering movement to the lower end of the unit resting freely on the offset portion thereof as the unit travels on the racks from one operating position to another and such arcuate movement of the lower end of the unit carries the forward ends of the magazines clear of the tops of the escapement actuating rods 16 and 17, all of which will be clear from the disclosure in the patents referred to.

Figure 9:
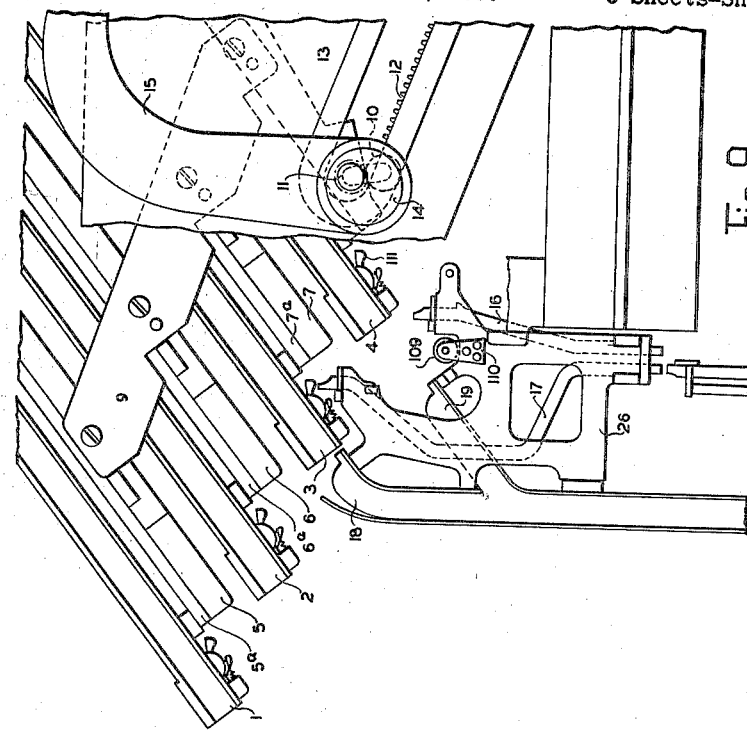
Fig. 9 is similar to Fig. 8 but shows the bottom magazine of the lower pair in the position it occupies during a magazine shifting operation.

It may be stated here that the magazines are each removably supported on their respective frames as by slidable carriages such as described in Patent No. 1,988,417, the carriages being disposed on the frames so that the front ends of the magazines during a shifting operation will stand in uniform stepped relation as shown in Fig. 9. Such carriages designated 5a, 6a, 7a and 8a, serve to transport magazines forwardly out of the column for removal purposes as explained in the patent referred to and in the present instance they serve also as convenient means for sliding the bottom magazine of any two shifted into operating position forwardly for cooperation with the lower assembler throat, see Fig. 8, and rearwardly preparatory to a shifting operation, see Fig. 9. Such sliding of a magazine on its supporting frame into and out of cooperation with the assembling devices is well known and may be accomplished manually as by lever means such as disclosed in my co-pending application Serial No. 296,194 filed September 23, 1939. However, since the actual mechanism for this purpose has no direct relation with the present invention it is deemed sufficient here merely to point out that the sliding movement referred to enables a magazine to be brought to a position where it will clear the rods 16 and 17 when the column is being shifted.

Figure 8:
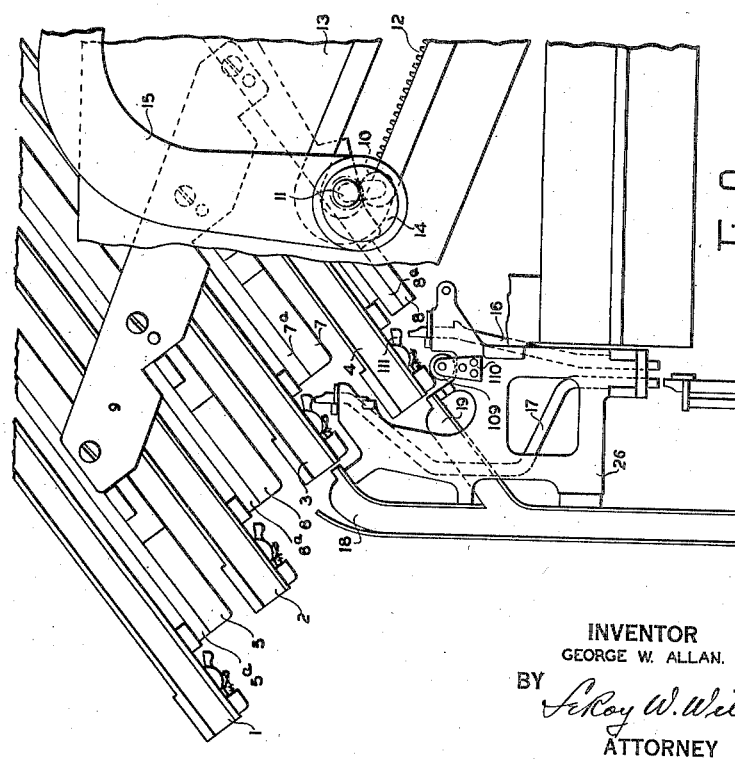
Fig. 8 is a partial side elevation showing the lower pair of magazines in operative position but with the bottom one of the pair elevated out of range of the escapement actuating devices of the keyboard.

As seen in Figs. 1, 8 and 9, the machine is provided with upper and lower assembler throats 18 and 19, upper and lower channel entrances 20 and 21, and two distributor bars 22 and 23, as shown in Figs. 1, 4 and 6. Also, the usual double set of distributor screws 22a, 23a are provided. The throat 18, channel entrance 20 and bar 22 accommodate the matrices belonging to 72-character fonts, and the throat 19, channel entrance 21 and bar 23 accommodate matrices belonging to 90-character fonts. The keyboard 24 is common to both magazines of a pair thereof occupying operative relation with the matrix assembling and distributing devices just mentioned, the keyboard having ninety finger keys 25, eighteen of which are inactive when it is connected to a 72-character font. A set of seventy-two rods 17 serve to actuate the escapements for magazines containing 72-character fonts and another similar set of ninety rods 16 actuate the escapements for 90-character fonts. These rods are arranged to reciprocate vertically in a fixed supporting frame 26 when actuated by a lower adjustable set of keyboard operated rods 27 of which there are ninety, one for each finger key of the keyboard, the rods 27 being carried in a frame 28 capable of swinging on pointed legs 29 which rest in a small groove across the top of the keyboard frame.

For swinging the frame 28 and rods 27 therein there is provided, preferably at the left side of the keyboard, a manually adjustable hand lever 30 pivoted at 31 in a suitable bracket 32 secured for convenience and as best seen in Fig. 3, to the side of the casting which supports the usual assembling elevator 33. To the rear of the pivot 31 and at the rear of an offset portion 30a of lever 30 is formed a forked opening 34 into which projects between adjustable screws 34a the end of one arm 35 of a two-armed lever pivoted at 36 to the side of the keyboard frame, the other arm 37 of said lever extending vertically and having in its free end a stud 38 which freely engages in a fork formed in the lower arm of a lever 39 pivoted at 40 in a bracket 41 secured to the machine frame. The upper arm of lever 39 is also forked to thereby freely engage a pin 42 in the side of frame 28. The forward part of the offset portion 30a of lever 30 constitutes an arc shaped surface 43 on which is stamped the markings "72" and "90," these being designated 44 and 45 respectively in Fig. 2a. According to the position of the hand lever 30 one or the other of the aforesaid markings will be visible to the operator through the window 46 in the cover plate 47. Lever 30 is held in its up or down position of adjustment by means of a ball 48 in a suitable bore in cover plate 47 in which it is retained by a flat spring 49, the ball seating in one or the other of the depressions 50 or 51 in the arc shaped surface 43.

It will now be apparent that movement of hand lever 30 results in rocking of lever arms 35, 37 and 39 about their respective pivots 36 and 40 whereby frame 28 is caused to swing at its upper end and thus move rods 27 into vertical alignment with the rods 16 or 17 as the case may be. Thus, the keyboard may be operatively connected through rods 27 and 16 to the escapements of a magazine containing a 90-character font or through rods 27 and 17 to the escapements of a magazine containing a 72-character font.

According to the invention the means described above for adjusting the set of keyboard rods 27 manually to operatively connect the keyboard to a 90 or 72-character font are utilized to effect simultaneously a corresponding adjustment of devices for directing the matrices to the proper one of the two distributors. In the present instance and with reference to Figs. 4 to 7, the matrices are directed to one or the other distributor bar 22 or 23 through the agency of a single distributor box 52 suitably secured to an arm 53 capable of swinging in a horizontal plane about a stud 54 secured in the rigid bracket or beam 55 which supports the entire distributor mechanism across the top of the machine. Arm 53 is formed with a grooved channel 56 for slidably guiding the usual distributor shifter slide 57, the latter having an offset and downwardly extending arm 58 which carries a spring pressed matrix pusher 59. Slide 57 is connected to link 57a which in turn is connected to a vertical lever actuated periodically by one of the main cams of the machine to advance a line of matrices M endwise off the second elevator S into the distributor box 52 and thence onto the main distributor bars 22 or 23, all in well known manner. When arm 53 is swung forward as in Fig. 4 the distributor box 52 is positioned for directing matrices to the 72-character distributor bar 22 and when swung rearward as in Fig. 6 the box 52 is positioned for directing matrices to the 90-character distributor bar 23.

The aforementioned arrangement of a single distributor box adapted to swing into operative relation with two distributors is well known and is disclosed in Letters Patent No. 1,202,719 granted October 24, 1916. In said patent, however, the swinging movement is controlled automatically through the agency of a driven clutch device the operation of which is controlled by distinguishing notches in the matrices, as provided for in "mixer" machines, whereas in the present instance the swinging movement of the box is accomplished manually through the train of connections hereinbefore referred to and now to be described.

To the stud 38, Figs. 1 and 2, is fastened one end of a horizontal link 60 the other end of which is loosely joined at 61 to the lower arm 62 of a two-armed vertical lever pivoted at 63 to the machine frame. The upper arm 64 of this vertical lever is provided near its upper end, Fig. 7, with a shoulder screw 65 the body 65a of which passes through an elongated overmotion slot 66 formed near one end of a link 67 the latter being held in place by the enlarged head of the shoulder screw. The opposite end of link 67 fits freely in a slot through the head of a stud 68 to which the link is pivotally fastened by a pin 69, and stud 68 is turnably mounted in a lateral projection 70 of arm 53 as by a stem 71 on the stud seated in a bore in the projection 70. To a screw 72 in the extremity of the vertical lever arm 64 is pivotally fastened one end of a short link 73 freely held by a pin 74 in the forked end of another link 75, the latter being loosely connected to the shoulder portion of a stud 76 secured in one end of a lever 77 which is pivoted at 78 to the distributor supporting beam 55. Before proceeding with further details of the construction and function of lever 77, the operation of the train of connections set forth above for adjusting the distributor box will be briefly discussed.

Referring to Figs. 1 and 2, when the hand lever 30 is in the down position as shown the keyboard rods 27 are aligned with the upper set of rods 17 to thus render the keyboard operative on the escapements of a magazine containing a 72-character matrix font. Under such condition link 60 is held rearward and link 67 is held forward through the agency of vertical lever arms 62, 64. Accordingly, swingable arm 53 to which link 67 is connected through stud 68 is held in forward position as shown in Fig. 4 where the distributor box 52 mounted on arm 53 is aligned endwise, at a slight angle, with the front or 72-character distributor bar 22. When the hand lever 30 is moved to the up position, indicated by dot-dash lines in Fig. 2, the keyboard rods 27 will be held in the dot-dash line position shown in Fig. 2 where they align with the upper set of rods 16 and thus render the keyboard operative on the escapements of a magazine containing a 90-character matrix font. Under such condition link 60 is held forward and link 67 is held rearward through its connection with the vertical lever arm 64. Thus the swingable arm 53 connected to link 67 by means of stud 68 is held rearward where the distributor box 52 is aligned endwise, at a slight angle, with the rear or 90-character distributor bar 23 as clearly shown in Fig. 6.

Going back to the aforementioned lever 77, the free end of this lever is formed with cam surfaces 79 and 80 the purpose of which will shortly appear. By means of a screw 81 in a bracket 82 secured to the distributor beam there is pivotally mounted a locking lever 83 having at one end a lug 84 which by engagement in a notch 85 or 86 in a plate 87 secured to the outer end of the swingable arm 53 locks the arm in forward or rearward adjusted position. The other end of lever 83 is provided with a shallow notch 88 and the lever carries a roller 89 which from Fig. 5 will be seen to lie in the path of the cam surfaces 79 and 80 on lever 77 when the latter is rocked about its pivot 78 through movement of link 75 by the vertical lever arm 64. Lever 83 is constantly urged counterclockwise by a spring 83ª. On an extension 82ª of bracket 82 there is provided a locking pawl 90 pivoted on a screw 91, one arm of said lever extending upwardly at an angle, see Fig. 5, and resting by gravity in the shallow notch 88 in the end of lever 83 to thus lock the latter under certain conditions as will shortly appear. On the other arm of locking pawl 90 is formed an angular lug 92, the angular face 93 of which lies in the path of two pins 94 and 95 secured in the arm 58 of the usual distributor shifter slide.

Pin 94 is so located that it contacts with face 93 of lug 92 and holds pawl 90 tilted counterclockwise when the distributor box 52 is aligned with the rear or 90-character distributor bar 23 and when the shifter slide has advanced as usual so far to the right as to push the last matrix out of the box onto the bar 23. This condition is indicated by the dot-dash line position of pine 94 in Fig. 6. Pin 95 is so located that it contacts with face 93 of lug 92 and holds pawl 90 tilted counterclockwise when the box 52 is aligned with the front or 72-character distributor bar 22 and when the slide has pushed the last matrix out of the box onto the bar 22. This condition is shown by the dot-dash line position of pin 95 in Fig. 4. It may be stated here that with the distributor shifter slide 57, 58 in its normal position of rest, one or the other pin 94 or 95 engages the lug 92 and pawl 90 is therefore normally tilted counterclockwise sufficiently to hold its upper arm out of the shallow notch 88 in lever 83. The only time pins 94 and 95 leave contact with lug 92 is when the slide is "out" as shown in Fig. 5 to allow the second elevator S to position a matrix line for endwise advance as usual by the slide into the distributor box. At such times pawl 90 engages notch 88 to thereby prevent a change in adjustment of the box until all of the matrices in a given line have been delivered to the distributor bar with which the box is aligned.

As stated above, cam surfaces 79 and 80 on lever 77 lie in the path of roller 89. The purpose of this arrangement is to provide for releasing the locking engagement of lug 84 in the notched plate 87 so that the arm 53 may swing in response to actuation of the train of connections therefrom to the hand lever 30. Release of the locking lever 83 is effected by rocking lever 77 which, due to the elongated overmotion slot 66 in link 67, occurs prior to movement of arm 53 by lever arm 64. The operation of these parts is as follows: Assuming that hand lever 30 is in the full line position shown in Fig. 2, arm 53 is then in the forward position shown in Fig. 4 with the distributor box aligned with the 72-character bar 22 and the body 65ª of shoulder screw 65 seated against the left or forward wall of slot 66 as in Fig. 7. If the hand lever 30 is now shifted to the dot-dash line position in Fig. 2, lever arm 64, in response to the shifting movement of lever 30 swings to the right in Fig. 7 without producing any movement of arm 53 until screw body 65ª reaches the right or rear wall of slot 66.

Meanwhile, however, link 75 which provides a positive connection between lever arm 64 and lever 77 rocks the latter clockwise, Fig. 4, whereby cam surface 79 contacts with roller 89 and thus swings the locking lever 83 clockwise an amount sufficient to bring lug 84 out of notch 85, see dot-dash line position in Fig. 6. It will be understood that such swinging of lever 83 can take place only when pin 94 or 95 (pin 95 in the present instance) is in contact with the angular face 93 of lug 92 whereby locking pawl 90 is tilted counterclockwise an extent sufficient to hold it out of the shallow notch 88 in lever 83. Pawl 90 thus prevents release of the locking lever 83 to effect a change in the adjustment of the distributor box 52 until the shifter slide has advanced all of the matrices in a given line onto the distributor bar to which they belong.

As soon as lug 84 is thus disengaged from notch 85 the screw body 65ª engages the rear wall of slot 66 and further movement of lever arm 64 results in swinging the arm 53 rearward about its pivot stud 54 until cam surface 80 on lever 77 leaves the roller 89. At this point and under the influence of spring 83ª lever 83 is free to swing conterclockwise in time for lug 84 to enter notch 86 and thus lock the arm 53 in position for alignment of the distributor box 52 thereon with the rear or 90-character distributor bar 23 as shown in Fig. 6.

If the hand lever 30 is now shifted back to the full line position in Fig. 2, lever 77 first rocks counterclockwise in response to movement of lever arm 64. Contact of cam surface 80 with roller 89 then results in swinging lever 83 clockwise as before, thus bringing lug 84 out of notch 86. Screw body 65ª which by this time engages the front or left wall, Fig. 7, of slot 66 transmits the swinging motion of lever arm 64 to the swingable arm 53 until lever 77 passes beyond roller 89 and thus allows lug 84 to engage in notch 86. The distributor box will then again be aligned with the front of 72-character bar 22 as in Fig. 4.

As previously stated, the train of connections from the hand lever 30 to the distributor box can be operated to change the adjustment of the box only when one or the other pin, 94 or 95, is in contact with lug 92 whereby locking pawl 90 is disengaged from notch 88. However, this is the normal prevailing condition except at such times as the shifter slide moves out to permit the second elevator S to introduce a line for distribution. Thus, to prevent changing the adjustment of the distributor box, and also of the keyboard rods, once a desired adjustment has been made, the invention provides an auxiliary locking bar 96, Figs. 2, 3 and 2ª, which is actuated by the usual assembler slide 97. Bar 96 is pivoted at 98 on the machine frame and is formed with bent over lugs 99 and 100 respectively at the upper and lower ends thereof. The assembler slide 97 is fitted with a fixed pin 101 which, when the slide is in its normal position as indicated by the full lines in Fig. 3, acts on the lug 99 and holds the bar 96 in the inclined position shown. As soon as the first matrix drawn from a selected font enters the usual assembling elevator 33, such matrix then standing vertically between the star wheel 102 and assembler slide finger 103 in well known manner, the leftward advance of the slide and pin 101 therein allows bar 96 to swing by gravity to a vertical position, or nearly so, as indicated by the dot-dash lines in Fig. 3. Such swinging of bar 96 results in lug 100 at the lower end thereof moving into cooperative relation with one of the shoulders 104 or 105 of a flange 106 which is suitably secured to the portion 30ª of hand lever 30. Assuming lever 30 to be in the full line position represented in Fig. 2, lug 100 will be seen to lie beneath the shoulder 105 and thereby prevent lever 30 from being shifted upward. Should lever 30 be adjusted to the dot-dash line position represented in Fig. 2, lug 100 would then overlie the shoulder 104 as indicated in Fig. 2ᵃ and thereby prevent lever 30 from being shifted upward.

It will now be apparent that the locking bar 96 is operative to lock the hand lever 30 against a change from a desired or selected adjustment as soon as the first matrix drawn from the selected font arrives in the assembling elevator, action as usual of the rotating star wheel 102 on such matrix which lies between it and finger 103 causing the slide 97 to advance leftward and such advance allowing bar 96 to swing sufficiently to cooperate at its lower end with one of the aforesaid shoulders on lever 30. Accordingly, although the pawl 90 is normally tilted and thus leaves the distributor box free to be adjusted, locking bar 96 comes into play immediately the operator commences the assembly of matrices in accordance with a selected adjustment and no change in such adjustment can then be made until all of the matrices in the particular line have been advanced by the distributor shifter 57, 58 to the distributor bar for which the adjustment was originally made.

Since locking bar 96 prevents the changing of an adjustment as soon as the assembly of matrices from a given font begins it will be evident that matrices from two different fonts cannot be assembled or "mixed" in the same line.

Referring now to Figs. 8, 9 and 10, the invention provides means for preventing the actuation of the matrix escapements of a magazine which is improperly related to the assembling devices with which it may be brought into register. Before describing the means referred to it should be explained that it is now common in practice to employ for 72-character matrix fonts, magazines which at their lower end are somewhat wider than the standard adopted for magazines carrying 90-character fonts, the increased width affording the required additional space for the large point size matrices ordinarily constituting a 72-character font. The relation of these different width magazines is illustrated in Fig. 10 wherein the width of the magazine 107 carrying a 72-character font is such that it extends at both sides, one more than the other, beyond the sides of the magazine 108 which carries a 90-character font. This arrangement is also disclosed in Letters Patent No. 1,960,182 granted May 22, 1934, to which reference may be had if desired.

According to the present invention there is provided at each side of the fixed keyrod supporting frame 26 a roller 109 journaled in a bracket 110 secured to the frame. Rollers 109 are so spaced apart as to allow magazines of standard width, like the magazine 108, to pass between them so that such magazines which contain 90-character matrix fonts may, as intended, move into cooperative relation with the lower or 90-character assembler throat 19. However, should a wide magazine containing a 72-character font, like the magazine 107, be moved into position for cooperation with the 90-character assembler throat 19, such magazine when slid forwardly from the position shown in Fig. 9 to that shown in Fig. 8 will be engaged at each side by one of the rollers 109. The purpose of such engagement will be clear from the fact that the rollers are mounted at such height as to raise the lower end of a wide magazine to such extent that the lugs 111 of the escapements are out of range of the reciprocating movement of the actuating rods 16. This will be evident from Fig. 8 wherein the magazine 4 is shown resting on rollers 109 whereby there is an appreciable gap between the top of rod 16 and escapement lug 111, such gap being much greater than that between the rod 17 and the escapement 5 for the magazine 3 which lies in proper operative relation with the upper assembler throat 18.

The arrangement just described will be seen to afford protection against releasing matrices from a magazine which is improperly related to the assembler throat and escapement operating rods before which it may be moved when the column of magazines is shifted, it being apparent that since the 90- and 72-character fonts may be employed in different desired locations within the shiftable column, such improper relation of magazine and assembling devices is bound to exist at times. As stated in the early part of this specification, only a 72-character font can be placed in the uppermost position in the column, this being due to the fact that the column cannot be shifted so far back in the machine as to bring a top magazine into register with the lower assembler throat. However, both 72- or 90-character fonts may be placed in any of the three lower positions in the column, and in any desired relative order.

While the means herein described for effecting simultaneous and corresponding adjustments of the keyboard rods and distributor box, or equivalent matrix directing devices, are discussed with particular reference to machines arranged to accommodate a plurality of both 72 and 90-character matrix fonts, it will be obvious to those acquainted with the art that such adjusting means may apply equally well to machines having double assembling and distributing facilities and carrying 90-character or 72-character fonts in all positions but devoid of the automatic matrix selecting devices common to "mixer" machines. Thus, in effect, the adjusting means referred to serves to connect the keyboard to a magazine presented to either of two fixed assembler throats and at the same time to determine and to fix the path of travel of the matrices for return thereof to the corresponding one of the two fixed distributors.

I claim:

1. In a typographical machine having a keyboard and two fixed sets of matrix assembling and distributing devices, the combination of a plurality of magazines shiftably arranged to bring different pairs thereof into operative relation with said devices, an adjustable set of keyboard operated rods for connecting the keyboard selectively to either magazine of the active pair, matrix directing means in advance of and common to both sets of distributing devices and adjustable into operative relation selectively with either set of the latter devices, and a train of connections operative to fix the adjustment of the matrix directing means in accordance with the adjustment of the keyboard rods.

2. In a typographical machine having a keyboard and two fixed sets of matrix assembling and distributing devices, the combination of a plurality of magazines shiftably arranged to bring different pairs thereof into operative relation with said devices, a set of adjustable keyboard operated rods for connecting the keyboard selectively to either magazine of the active pair, an adjustable distributor box for directing matrices selectively to either of the distributing devices according to the adjusted position of said box, and manually operated means for effecting simultaneous and coordinate adjustment of said keyboard rods and distributor box.

3. In a typographical machine having a keyboard and two fixed sets of matrix assembling and distributing devices differing in form, the combination of a plurality of magazines differing in form and shiftable as a whole to select a desired magazine for registry with the set of assembling and distributing devices corresponding thereto in form, a set of keyboard operated rods adjustable to connect the keyboard to the assembling devices for the selected magazine, matrix directing means in advance of and common to both sets of distributing devices and adjustable into operative relation with either set of said devices, and manually operated connections between the keyboard rods and the matrix directing means for effecting their adjustment simultaneously into operative relation with assembling and distributing devices of like form.

4. In a typographical machine, the combination of two fixed sets of matrix assembling and distributing devices, a keyboard having an adjustable set of rods common to both sets of assembling devices, adjustable matrix directing means in advance of and common to both sets of distributing devices, and a manually adjustable train of connections adapted to maintain a constant operative relation between said set of rods and said directing means and operative to effect their movement simultaneously from one to the other of the sets of assembling and distributing devices.

5. In a typographical machine, the combination of two fixed sets of matrix assembling and distributing devices differing in form, a keyboard having an adjustable set of rods for connecting it selectively to either set of assembling devices, matrix directing means in advance of the sets of distributing devices and adjustable into operative relation with either set thereof, and manually operated connections between said set of rods and said directing means for compelling their simultaneous adjustment into operative relation with assembling and distributing devices of corresponding form.

6. A combination according to claim 4, including as a further element a lock device for retaining the matrix directing means in adjusted position, and wherein the train of connections includes a lost motion link adapted to release the lock device during the adjustment of said connections.

7. A combination according to claim 4, including as additional elements a matrix shifter slide movable periodically between normal and matrix receiving positions and a lock device, both of said elements being associated with the matrix directing means, and wherein the lock device is held released by said slide when the latter occupies normal position to thereby permit adjustment of the train of connections whereas in the matrix receiving position of said slide the lock device is operative to prevent adjustment of said connections.

8. A combination according to claim 4, including as further elements an assembler slide adapted to advance upon the assembly of matrices thereagainst and a locking lever associated therewith and with the manually adjustable train of connections, said slide having a pin adapted normally to retain the locking lever in inoperative position but to render said lever operative to lock the train of connections against adjustment upon the advance of the slide by a matrix.

9. In a typographical machine having two assembler throats differing in form for assembling matrices selectively from two magazines correspondingly differing in form, the combination of a set of keyboard operated rods having means for adjusting them into operative relation with either magazine, matrix assembling means including an assembler slide adapted to be advanced by the matrices, and a lever controlled by the slide and adapted to lock the keyboard rods against adjustment upon advance of the slide by a matrix.

10. In a typographical machine having a keyboard and two sets of matrix assembling and distributing devices differing in form to accommodate matrices respectively from fonts differing as to the number of characters they comprise, the combination of a plurality of magazines each provided with a series of escapements and, each containing a font of matrices, said magazines being arranged in superposed relation without regard to the number of characters in the fonts contained therein and being carried on supporting frames comprising a unit which is shiftable as a whole to position a desired magazine before assembling and distributing devices of the proper form for the selected font, two sets of escapement actuating rods, one set for each form of assembling device and differing accordingly as to the number of rods therein, a set of keyboard operated rods adjustable into operative relation with either set of actuating rods, and means adapted to raise out of operative range of said actuating rods the escapements of any magazine improperly related to the form of assembling device before which it is positioned.

11. In a typographical machine according to claim 10, wherein the means adapted to raise out of operative range of the actuating rods the escapements of any magazine improperly related to the form of assembling device before which it is positioned comprises rollers adapted to engage the lower end of an improperly related magazine to thereby effect the required elevation of said magazine.

12. In a typographical machine according to claim 10, wherein the magazines differ in width according to the number of characters in the fonts they contain, and wherein the means adapted to raise out of operative range of the actuating rods the escapements of any magazine improperly related to the form of assembling device before which it is positioned comprises rollers so located on the machine frame as to engage at the lower end and at each side the projecting positions of the wider magazines and thereby effect the required elevation of such magazines.

13. In a typographical machine, the combination of two sets of matrix assembling and distributing devices differing in form, and each constantly conditioned for the passage therethrough of matrices from fonts likewise differing in form and presented thereto, a plurality of superposed magazines containing the matrix fonts and shiftably arranged to bring a selected one thereof into operative relation with one set of said devices, a keyboard having an adjustable set of rods common to both sets of assembling devices, adjustable matrix directing common to both sets of distributing devices, and a train of connections between said rods and said box for effecting their adjustment simultaneously into operative relation with the set of assembling and distributing devices corresponding in form to the selected magazine.

14. In a typographical machine having two fixed sets of matrix assembling devices differing in form, the combination of a column of superposed magazines each provided with escapements and comprising in varying relation within the column magazines containing matrix fonts differing in form, means for shifting the magazines to present a selected one thereof in operative position with respect to one of the sets of assembling devices, a set of escapement actuating rods adjustable into operative relation with the escapements of a magazine presented to either set of assembling devices, and means adapted to raise out of operative range of said rods the escapements of a magazine improperly related to assembling devices to which it is presented.

15. In a typographical machine, the combination of two assembler throats constantly conditioned for the passage therethrough of matrices respectively from two different magazines presented thereto, a set of keyboard operated rods adjustable into operative relation with either magazine to effect the release of matrices therefrom for assembly into a line, and locking means operative automatically upon arrival in the line of the first matrix released to prevent a change in the adjustment of said rods.

16. In a typographical machine, the combination of two assembler throats constantly conditioned for the passage therethrough of matrices respectively from two different magazines presented thereto, a set of keyboard operated rods adjustable into operative relation with either magazine to effect the release of matrices therefrom for assembly into a line, and locking means controlled by the first matrix entering the line and operative to prevent alteration in the adjustment of said rods.

GEORGE W. ALLAN.